Dec. 20, 1932.  H. W. ROOS  1,891,557
APPARATUS FOR LAYING CONCRETE FLOORS
Filed Jan. 17, 1930  6 Sheets-Sheet 1

INVENTOR
Henry W. Roos
BY Harold E. Stonebraker
his ATTORNEY

Dec. 20, 1932.   H. W. ROOS   1,891,557
APPARATUS FOR LAYING CONCRETE FLOORS
Filed Jan. 17, 1930   6 Sheets-Sheet 2
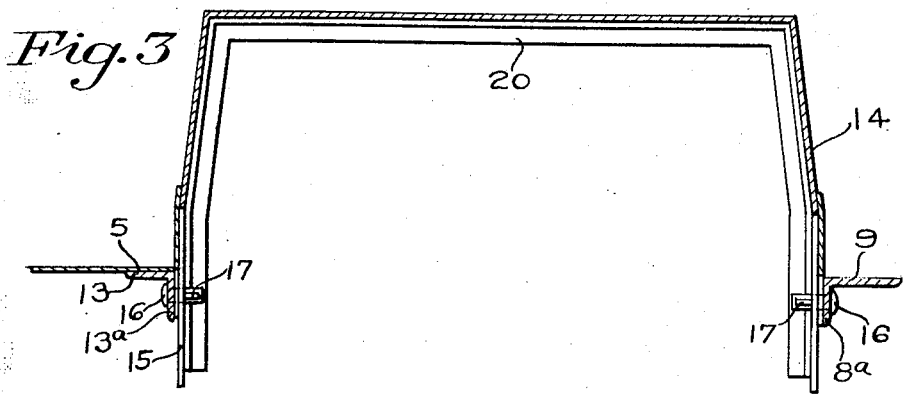
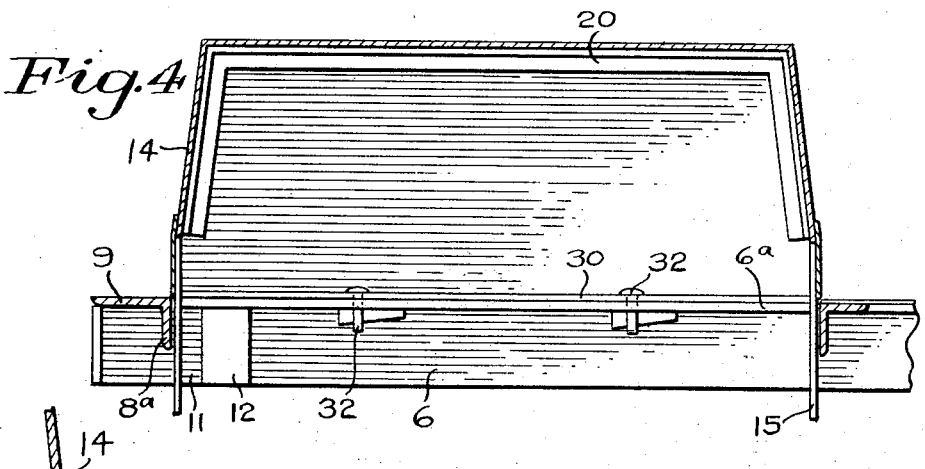
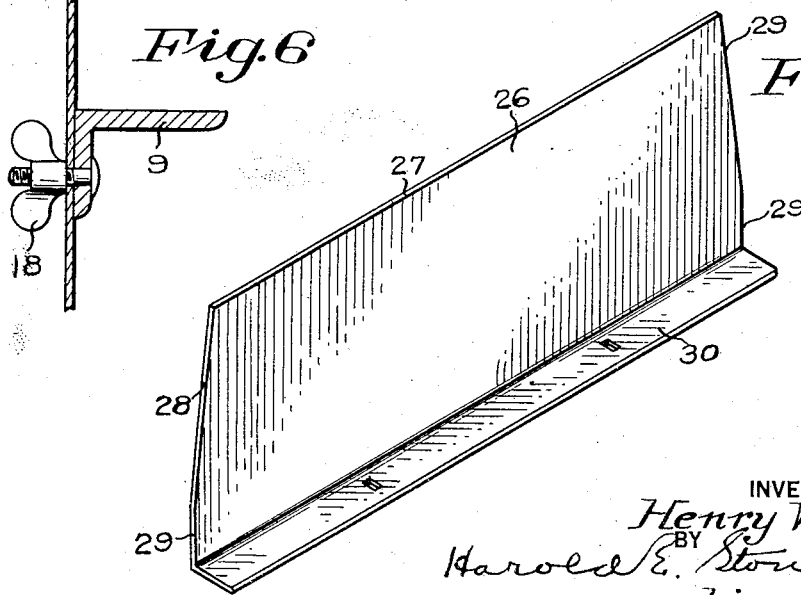
INVENTOR
Henry W. Roos
BY Harold E. Stonebraker
his ATTORNEY Dec. 20, 1932.   H. W. ROOS   1,891,557
APPARATUS FOR LAYING CONCRETE FLOORS
Filed Jan. 17, 1930   6 Sheets-Sheet 3
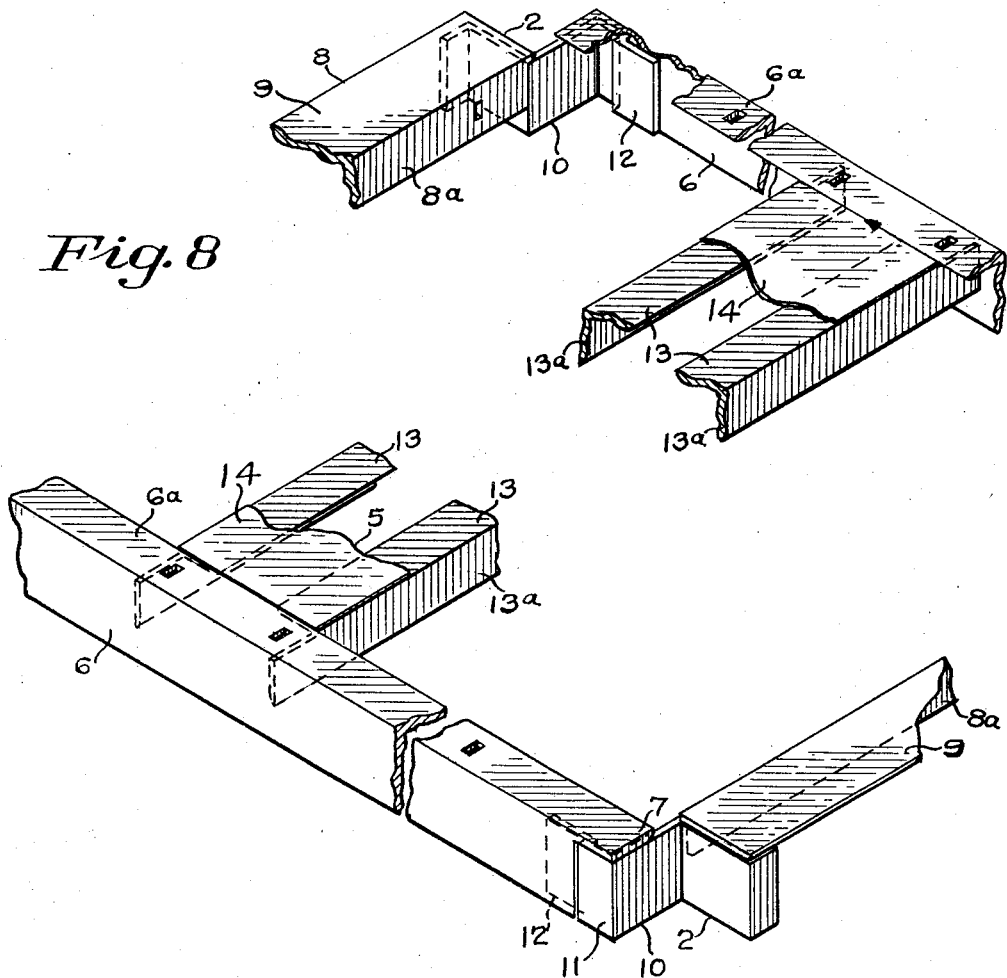
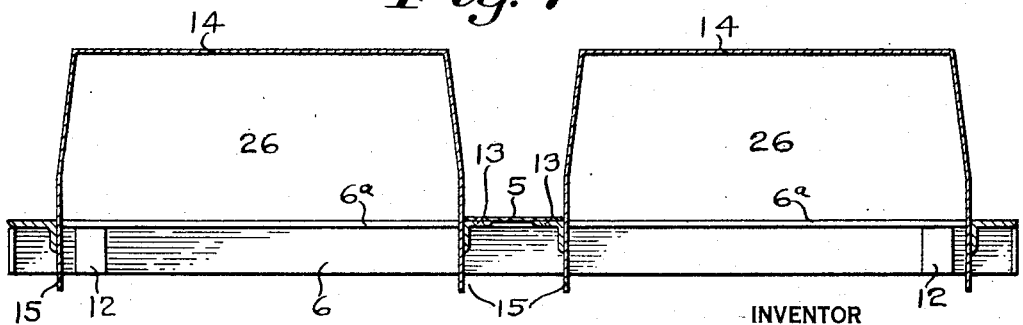
INVENTOR
Henry W. Roos
By Harold E. Stonebraker,
his ATTORNEY Dec. 20, 1932.  H. W. ROOS  1,891,557
APPARATUS FOR LAYING CONCRETE FLOORS
Filed Jan. 17, 1930  6 Sheets-Sheet 4

INVENTOR
Henry W. Roos
BY Harold E. Stonebraker
his ATTORNEY

Dec. 20, 1932.   H. W. ROOS   1,891,557
APPARATUS FOR LAYING CONCRETE FLOORS
Filed Jan. 17, 1930   6 Sheets-Sheet 5

INVENTOR
Henry W. Roos
BY
Harold E. Stonebraker
his ATTORNEY

Dec. 20, 1932.   H. W. ROOS   1,891,557
APPARATUS FOR LAYING CONCRETE FLOORS
Filed Jan. 17, 1930   6 Sheets-Sheet 6

INVENTOR
Henry W. Roos
BY Harold E. Stonebraker
his ATTORNEY

Patented Dec. 20, 1932

1,891,557

UNITED STATES PATENT OFFICE

HENRY W. ROOS, OF CINCINNATI, OHIO

APPARATUS FOR LAYING CONCRETE FLOORS

Application filed January 17, 1930. Serial No. 421,489.

This invention relates to improvements in apparatus for laying concrete floors, and particularly to the construction of concrete floors having joists extending longitudinally thereof at frequent intervals between the beams.

The object of the invention is to provide apparatus of this kind which is simple in construction, inexpensive to make, and which can be more quickly assembled on temporary supports or shores than apparatus of the kind previously used.

Another object of the invention is to provide an apparatus of this kind in which a plurality of dome-shaped forms may be assembled on frames and the frames assembled on temporary supports or shores as a unit.

Another object of the invention is to provide a frame adapted to be mounted on shores or temporary supports on which a plurality of dome-shaped forms may be adjustably mounted.

A still further object of the invention is to provide simple means which can be quickly secured in position for closing the ends of the open domes.

Still another object of the invention is to mount a plurality of dome-shaped forms on frames, said domes being spaced from each other and from the sides of the frame, and the frames assembled on temporary supports with the domes of successive frames in alinement and the spaces between the domes on the frame and between domes on adjacent frames providing molds for the formation of joists between them.

Still another object of the invention is to mount a plurality of dome-shaped forms spaced from each other and from the sides of a frame on which they are mounted to form molds for joists between them and between the domes on laterally adjacent frames when the frames are assembled on temporary supports, the adjacent ends of domes on adjacent frames terminating short of the ends of the frames, and the open ends of the domes being closed to form molds extending transversely to the joist molds for the formation of a bridge or beam.

Where frames of uniform size on which forms are mounted are assembled on temporary supports to form a floor mold, it generally happens that when the last row of frames is laid that a space remains which is of less width than the length of a frame, and consequently cannot be bridged by the frames of uniform size, and it is one of the objects of the present invention to provide means for quickly bridging this space, said means comprising a skeleton frame which may be mounted temporarily on the temporary supports on opposite sides of the space to bridge the space and properly position the temporary supports or shores at the sides of the space, and stabilize the supports and forms provided of sufficient length to lap over the ends of the forms on the adjacent frames and be supported directly on the latter forms to bridge the space, the skeleton frames being removed or left on the supports under the lap forms.

To these and other ends the invention consists in the construction and arrangement of parts that will appear from the following description when read in conjunction with the accompanying drawings, the novel features being pointed out in the claims at the end of the specification.

In the drawings:

Figure 3 is a vertical section taken substantially on line 3—3 of Figure 2 and looking in the direction of the arrows at said line;

Figure 4 is a vertical section taken substantially on line 4—4 of Figure 2 and looking in the direction of the arrows at said line;

Figure 5 is a perspective view of a plate for closing the end of the dome;

Figure 6 is a sectional detail showing another way of securing the dome form in the frame;

Figure 7 is a transverse vertical section through the frame and the dome forms mounted thereon, the section being taken substantially on line 7—7 of Figure 1;

Figure 8 is a fragmentary view showing the construction of the frame;

Figure 1:
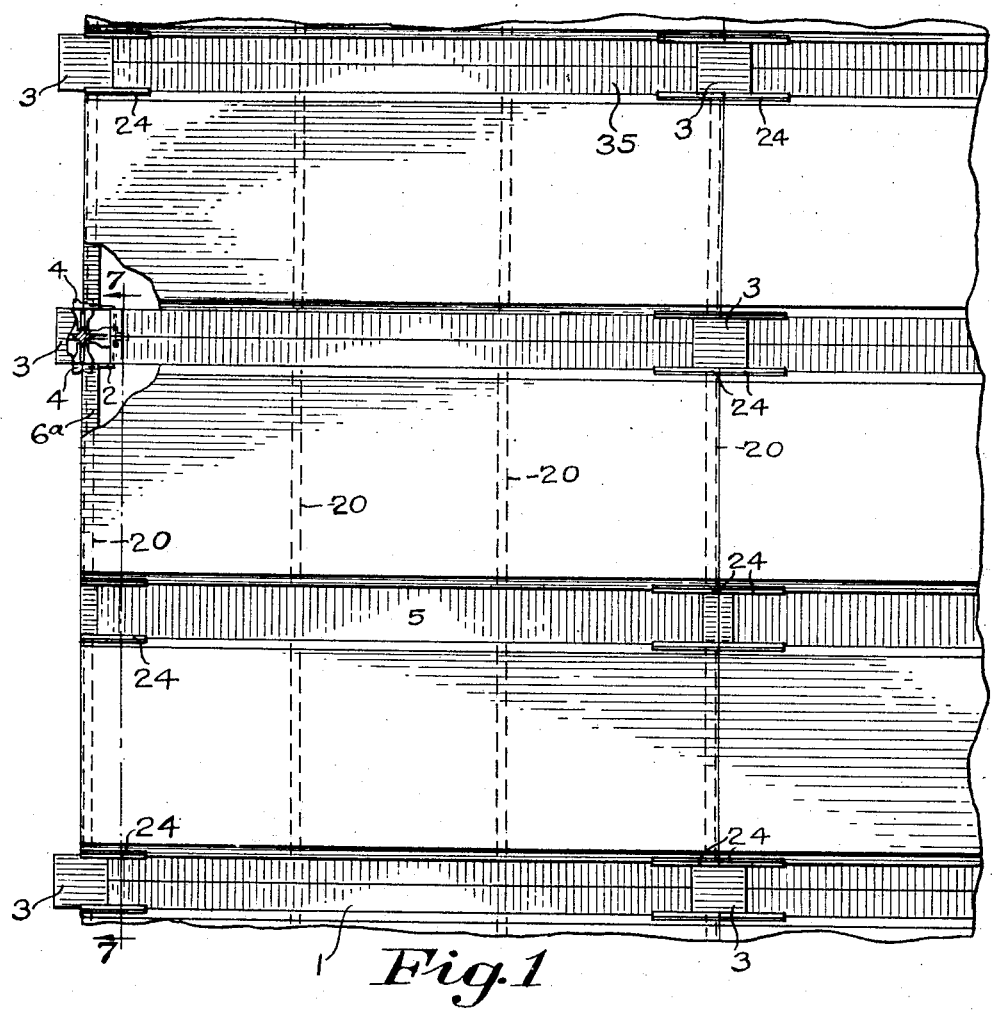
Figure 1 is a fragmentary plan view of assembled forms for a mold for a concrete floor constructed according to one embodiment of the invention.

Referring specifically to the drawings, in which like reference numerals refer to the same parts in all the figures, 1 designates generally a frame substantially rectangular or square in shape and formed with reentrant angles 2 at its corners to fit closely around the square tops 3 of temporary supports or shores having releasable engaging devices 4 adapted to engage adjacent frames and support them with their adjacent sides in close contact with each other and the tops of the shores. Extending between the ends of the frame is a cross-member or bridge 5 providing two elongated openings in the frame in which the forms are mounted.

Referring to Figure 8 in which the construction of the frame is illustrated, it will be noted that the frame comprises L-shaped end members or bars 6 having inwardly projecting top flanges 6$^a$ projecting at 7 beyond the ends of the downwardly projecting flanges. Extending between the end bars are the side rails 8 also L-shaped in cross-section, having a downwardly projecting inside flange 8$^a$ and an outwardly projecting top flange 9 arranged in the same horizontal plane with the flanges 6$^a$ of the end bars. The adjacent ends of the side bars 8 and end bars 6 are connected by means of the brackets 10. Each of the brackets 10 comprises two vertical walls arranged at substantially right angles to each other with the apex of the angle directed inwardly to form the angles 2 previously mentioned. The ends of the vertical walls are bent to extend in the general direction of the side and end bars.

The part 11 extending in the direction of the end bar is offset inwardly at 12 to engage the inner wall of its downwardly projecting flange. The corner brackets 10 may be secured to the side and end bars by any suitable means, preferably by electric welding. By this construction, the corners of the frames are adapted to fit closely around the square tops 3 of the shores when the corner brackets engage the devices 4. Each of said devices is engaged by two adjacent corner brackets and are provided with means for camming them toward each other, causing the adjacent frames to lie in close contact with each other.

Connecting the end bars 6 and arranged parallel with the side bars 9 is a bridge 5 previously mentioned. Said bridge comprises a pair of bars or rails 13 spaced from each other and secured to the end bars by any suitable means, such as electric welding. Each of the bars 13 is L-shaped in cross-section, having an inwardly projecting horizontal flange and a downwardly projecting flange 13$^a$ on the sides opposite each other. A plate 14 of sheet material closes the space between the cross-rails and may be secured thereto by welding or other suitable means. The bars 13 may be arranged at equal distances from the side members 8 of the frame to provide two elongated openings of equal size and similar in shape, in which suitable forms may be mounted.

In Figures 3, 4 and 7 is illustrated in cross-section a form 14 adapted to be mounted in the frame. Said forms are preferably constructed of sheet material bent in the general form of arches or domes, having a plane surface at the top, from the sides of which the side walls incline outwardly and downwardly, terminating in vertical portions 15 spaced from each other a distance substantially equal to the distance between the side rail 8 and the adjacent cross-rail 13 of the frame. The forms may be secured in the frame by any suitable means, such as headed bolts or pins 16 which may have their inner ends slotted for the reception of wedges 17, or they may be threaded for the reception of butterfly nuts 18, as shown in Figure 6.

The dome forms 14 are of a length substantially equal to the extreme length of the frames so that the ends of the domes are flush with the ends of the frame and fit closely against the ends of the domes on the adjacent frames when the frames are assembled to form a floor mold. By this arrangement, continuous parallel dome forms are produced in effect, having depressions between them in which longitudinal joists are formed when the concrete is poured on the forms for the floor. In order to strengthen the dome forms and enable them to carry the load of concrete without bending or warping, they may be reinforced at frequent intervals by means of angular ribs or bars 20 extending around and in contact with the inner side of the dome and secured thereto by electric welding or other suitable means.

Floors for different purposes or often for different parts of the same building are often required to carry different loads, and to meet this requirement it is desirable to construct them with joists of different thickness or depth. For this purpose, the dome forms are so constructed that they are adjustable on the frames to vary the vertical distance between the top of the dome and plane of the frame. As previously indicated, the domes are detachably secured in the frames by means of bolts which engage openings in the frame, and openings 21 corresponding thereto adjacent the lower edge of the sides of the dome.

Figure 2:
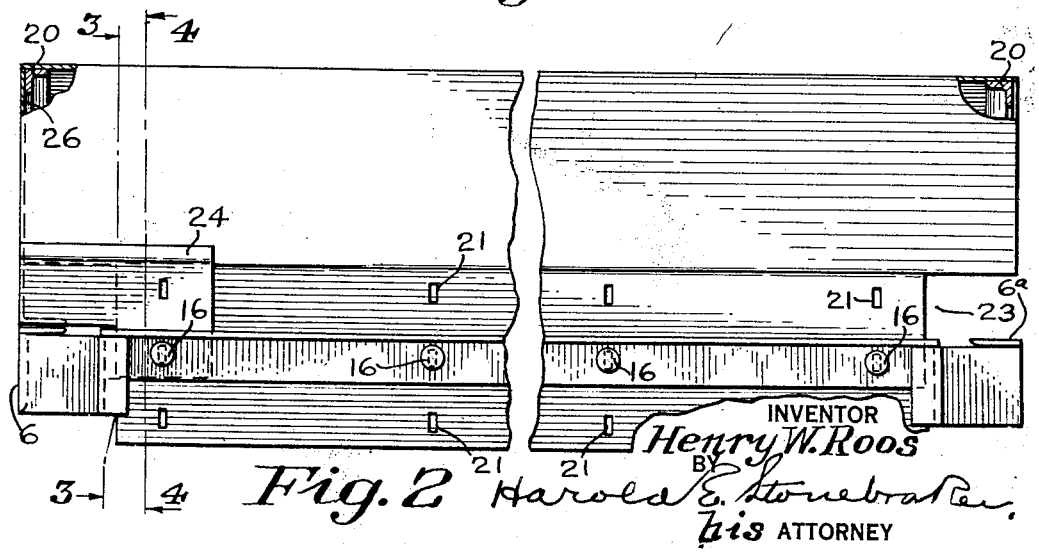
Figure 2 is an enlarged side elevation of a frame with dome forms mounted thereon partly in section and broken away to expose underlying construction.

By reference to Figure 2 of the drawings, it will be noted that a line of openings 21 is arranged in the same horizontal plane on opposite sides of the dome, and several lines of openings, depending on the degree of adjustability desired, may be provided in different horizontal planes, three such lines of openings being shown in the present embodiment, permitting adjustment of the domes on the frames to three positions.

The side walls of the domes are cut away at their ends at 23 at a point adjacent and above the upper line of openings 21 to provide a clearance for the end rails or bars of the frame when the dome is adjusted thereon and to permit the dome form to project over the frame so that the ends of the dome and frame may lie in the same vertical plane. When the dome form is mounted on the frame so that its ends rest thereon, the bolts which secure it in the frame engage the upper row of openings 21 and the joists formed between the domes will have the least vertical thickness or depth it is possible to produce with the forms. At this time, the projecting ends of the domes rest directly on the end bars of the frame.

To produce thicker joists, the forms must be raised so that the bolts securing them to the frame engage one of the lower rows of openings. Referring to Figure 2, it will be noted that when the securing means engage one of the lower rows of openings, the projecting ends of the dome form are raised from the frame, leaving an opening. Means are provided for closing these openings. Said means comprise plates 24 preferably constructed of sheet material and generally L-shaped in outline. These plates are adapted to lie against the outer face of the side of the form with one end 25 flush with the end of the form and resting on the top of the frame member 6. It projects downwardly inside the frame member 6 and between the side of the form and the side of the frame. The plate 24 is provided with an opening adapted to register with the adjacent opening 21 in the form to be secured in position by the same bolt which secures the form to the frame. At their ends, the joists formed between the domes may merge into a beam or a wall at the side of the building, and it is desirable to provide means for closing the open ends of the dome forms at these points. This can be accomplished in a number of ways.

In Figure 5 is shown an end plate 26 adapted to close the end of the dome. The end plate 26 is preferably constructed of sheet material and of a shape corresponding to the shape of the end of the dome or a transverse vertical section thereof having a straight upper edge 27, from which the ends taper outwardly and downwardly at 28, terminating in short straight portions 29. At its base, it has an inwardly projecting flange 30 adapted to engage the top of the end of the frame to which it may be secured by any suitable means, such as the bolts 32. The end plate 26 is so constructed that when secured in position, it lies closely against the end of the dome and its outer edges lie substantially flush with the top and side walls of the dome to close it completely, or it may engage one of the bars 20 arranged in the end of the dome.

When assembling frames of standard shape and size, it frequently happens that a space remains across the end or between two parts of the assembled floor that is too narrow for a full sized frame, or it may be desirable to assemble a floor form a single dome at a time. For this purpose, frames 35 may be provided constructed like the frames 1 and of the same length, but of only one-half the breadth, and therefore adapted to have but a single form mounted thereon. Such frames are readily assembled on the temporary supports and may be readily combined with frames of standard size, as shown in Figure 1.

It will be noted that means are provided for quickly assembling a plurality of forms as a unit on temporary supports or shores to provide a form on which the concrete may be poured for the floor. By assembling the dome-shaped forms herein described on the frames, lines or rows of domes are formed having depressions between them in which joists are automatically formed, resulting in a floor adapted to carry a heavy load. By adjusting the dome forms on the frames, the vertical thickness or depth of the joists to be formed can be varied to provide for floors adapted to carry other loads.

Figure 9:
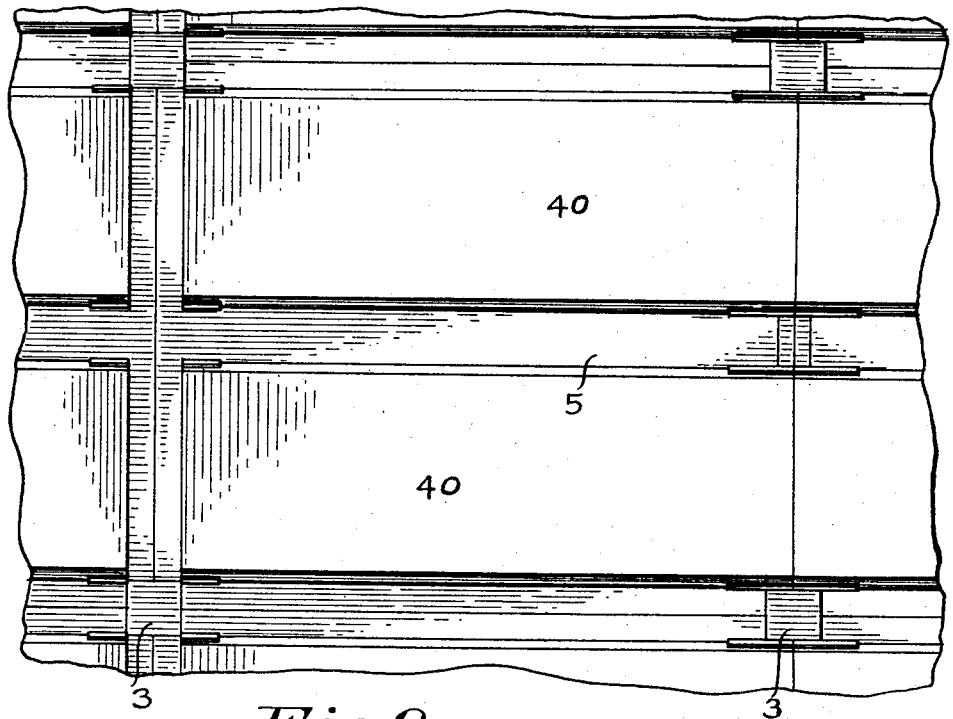
Figure 9 is a fragmentary plan view of a floor mold of assembled dome-shaped forms showing how the construction may be adapted to provide a mold for a bridge or beam arranged transversely to the joists to be formed between the domes.
Figure 10:
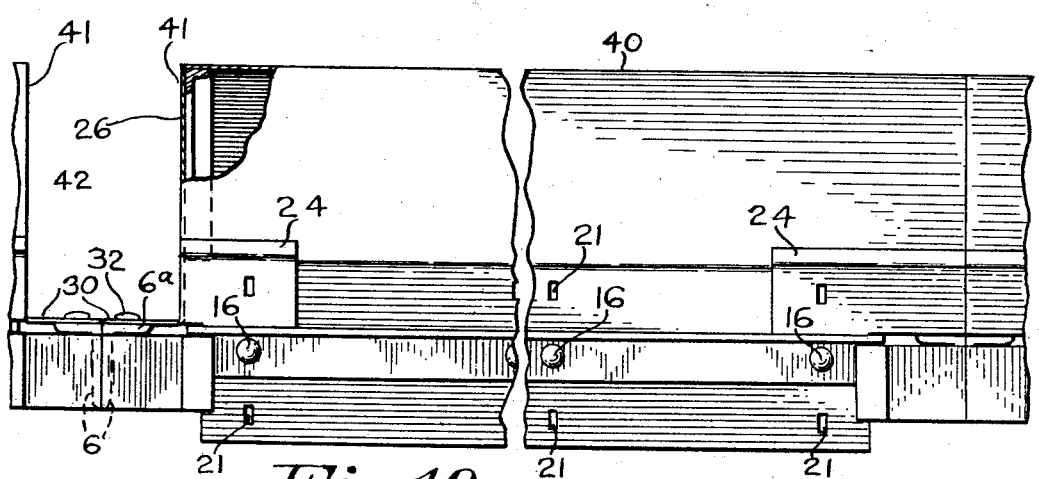
Figure 10 is a side elevation of a dome form and frame especially constructed for the formation of a bridge mold, partly broken away and partly in section.

In constructing a floor having a long span or required to carry heavier loads, it is sometimes desirable to provide additional reinforcing means. The dome forms herein described may be readily assembled to provide for the formation of a bridge or beam extending transversely of the joists and arranged at substantially right angles thereto. In Figures 9 and 10 is illustrated a simple way in which this can be accomplished. For this purpose, special dome forms 40 may be provided, in all respects like those previously described, except that they are cut away at one end as at 41 and the adjacent forms assembled with the short ends facing each other so that the adjacent ends 6 of the frames are exposed between them. The open ends of the domes are closed by means of the end pans 26 which are bolted to the frame members 6 with the flanges 30 of the end plates projecting away from the domes, which do not project over the end members of the frame. By this construction, an opening or space 42 may be provided between the ends of adjacent domes and extending across the assembled floor form at substantially right angles to the joist forms and of substantialy the same vertical depth or thickness.

Figure 11:
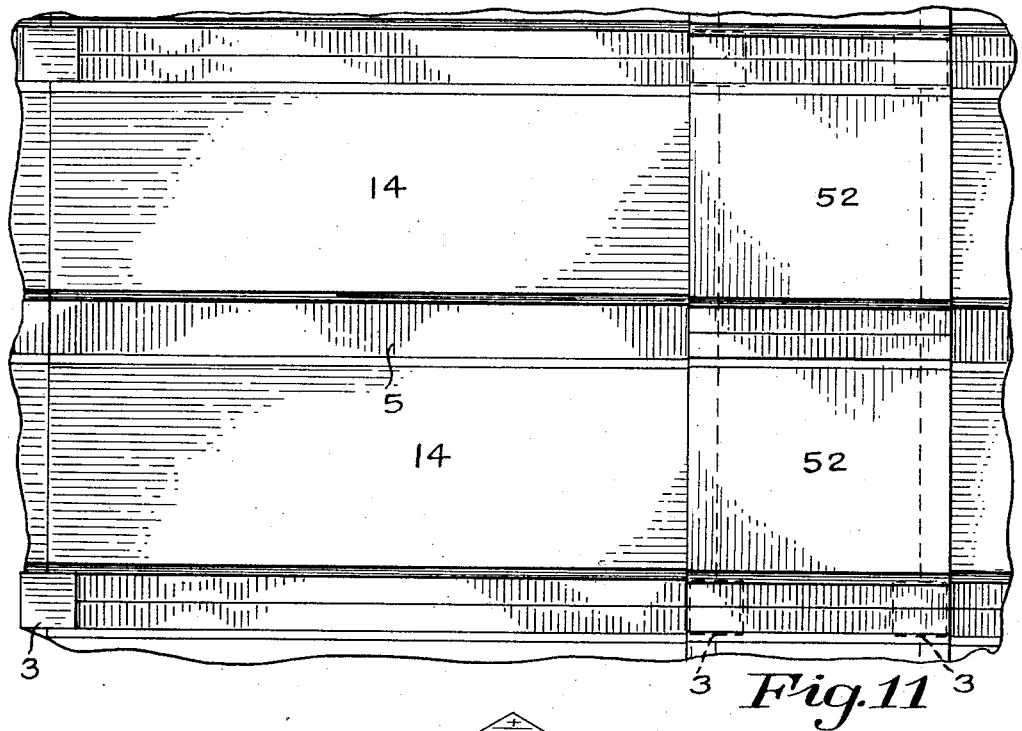
Figure 11 is a fragmentary plan view of a floor mold of assembled dome-shaped forms, showing how a space of less width than the length of a standard unit form may be bridged to continue the floor mold thereover.
Figure 12:
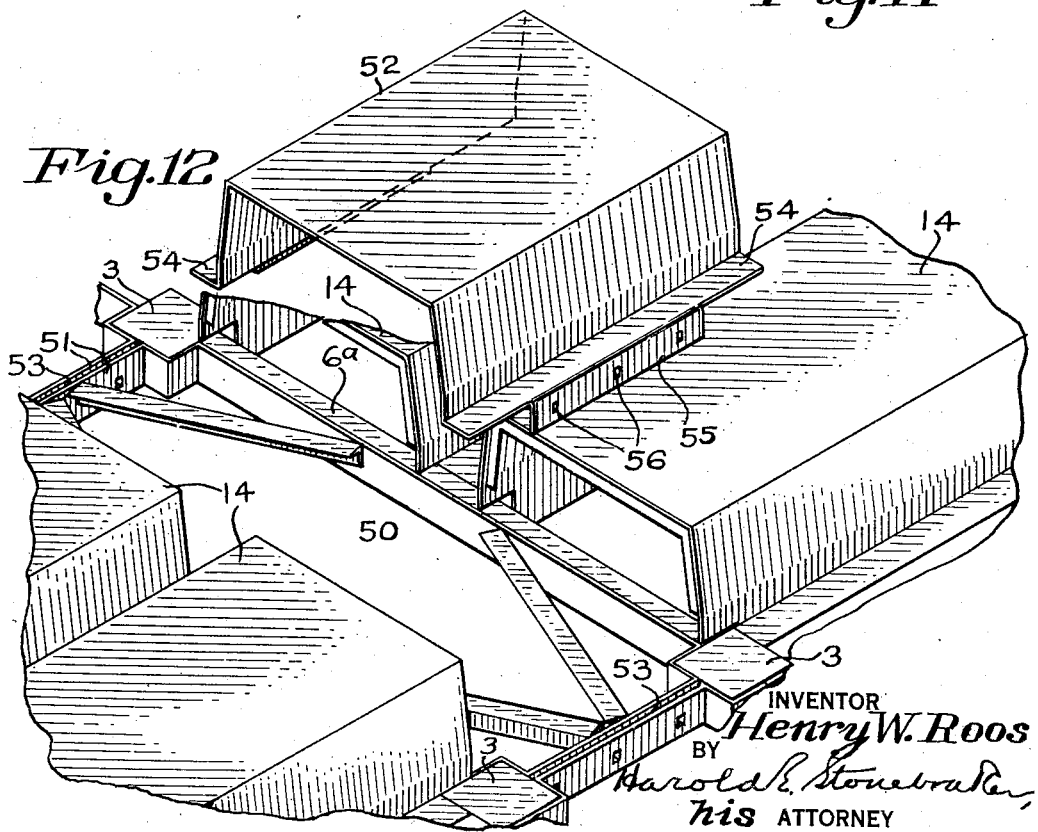
Figure 12 is a fragmentary perspective view of the same showing the special lap forms removed and one of them supportedidly on a dome to show the details of its construction.
Figure 13:
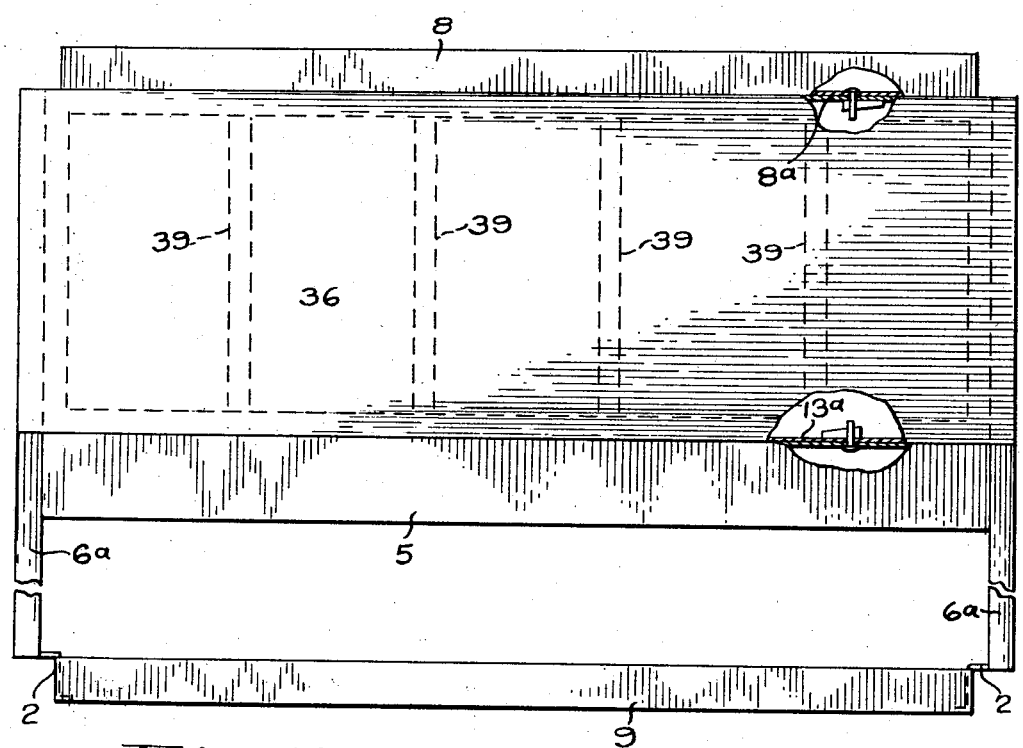
Figure 13 is a plan view of the frame showing how a flat form can be mounted thereon in place of the dome.

Referring to Figures 11 and 12, there is shown a mold for a floor assembled of dome-shaped forms 14 mounted in frames and mounted on temporary supports or shores as above described. When laying forms of uniform size and shape for such a floor mold from the sides of the floor, it generally happens that a space such as 50 is left at the finish, which is of a width less than the length of a frame and hence too narrow to be bridged by a standard sized frame. A simple way is shown for bridging this space quickly and inexpensively. To this end, skeleton frames such as 51 may be provided which are adapted to be arranged in the plane of and between the dome frames and to be mounted on and engage the adjacent shores. By this arrangement, the skeleton frames serve to stabilize the adjacent floor forms and to locate the position of the supports on which they are mounted and also to provide a temporary bridge for the narrow gap.

To bridge the dome forms over the narrow gap, special forms 52 are provided which are adapted to lap over and rest with their ends supported on the ends of the adjacent dome forms, thus continuing the floor mold over the gap and over the skeleton frames 51 arranged therein, or preferably, the frames are removed before bridging the gap with the forms. The skeleton frames may be of any preferred construction, but should be rigid and provide slots 53 between adjacent frames and between the domes on the frames, which slots extend across the space to accommodate downwardly projecting lateral flanges 55 on the lap forms 52.

The lap forms 52 are preferably constructed of sheet material bent to conform to the shape of the dome forms 14 to fit closely over the ends of the same. They may be made of any convenient or preferred length and the same forms may be used for bridging gaps of different widths, but must be of sufficient length to lap over the ends of the adjacent forms. Along the lower edges of the sides of the lap pans, horizontally or outwardly projecting flanges 54 may be provided of a width corresponding to the width of the side rails of the frames and adapted to lie on the side rails and bridges of the adjacent frames and bridge the gap between them. Intermediate their ends the flanges 54 may be provided with downwardly projecting flanges 55, and the flanges of two adjacent forms engage each other and may be provided with openings 56 at convenient intervals, the openings in adjacent flanges registering with each other so that they may be secured together by bolts or other suitable means passing through the openings.

Figure 14:
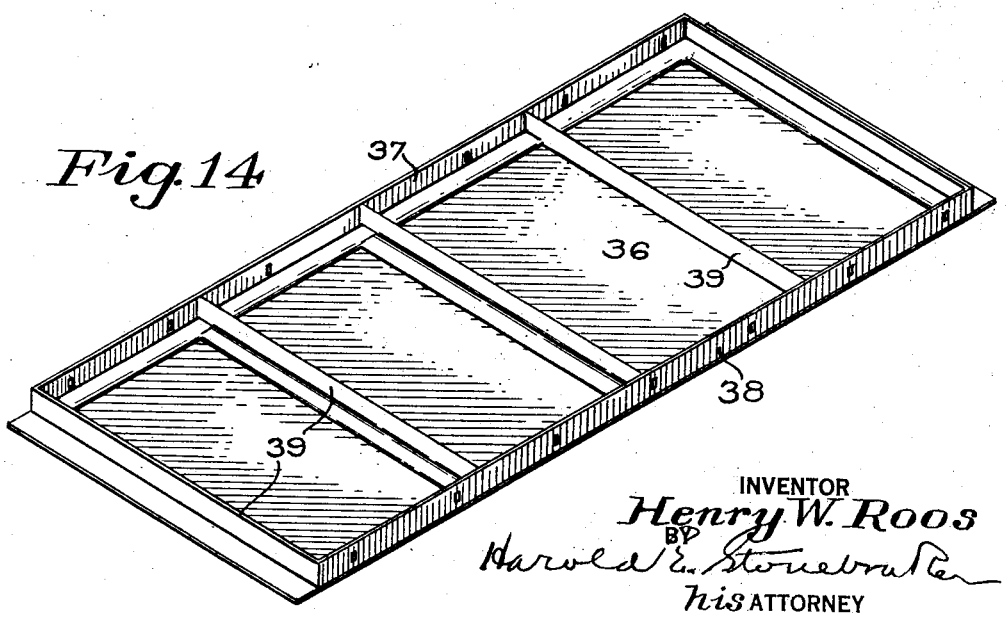
Figure 14 is a perspective view of the underside of the form shown in Figure 13.

The frames 1 and 35 may be employed for assembling forms of the flat type and are desirable for constructing a floor form of flat forms assembled on frames, or when it might be desirable to construct a portion of the floor of domes and another portion of flat forms. A flat form adapted to be assembled in a frame is shown in perspective in Figure 14, and comprises a body portion 36 preferably constructed of sheet material and reinforced by downwardly projecting side flanges 37 and 38 connected at intervals by cross-bars 39, all of which may be secured to the body portion by any suitable means such as electric welding.

The ends of the body 36 are adapted to project over and rest on the end members of the frame, and the flanges 37 and 38 lie adjacent the flanges 8ª and 13ª of the frame to which they may be secured by bolts as shown, or other suitable means. It will also be noted that the reinforcing cross-bars 39 at the ends of the form are not flush with the ends but are arranged a short distance therefrom so that they project into the frame and permit the form to lie on the end members thereof.

Although preferred means for carrying out the invention are specifically described herein, the invention may be performed in different ways, and it will be understood that this application is intended to cover all such changes or modifications thereof as may come within the spirit of the invention or scope of the following claims.

I claim:

1. An apparatus for laying concrete floors comprising a plurality of frames adapted to be supported at their corners on temporary supports, and a plurality of dome-shaped forms mounted on each of said frames spaced from each other to form joists between them and flush with the ends of said frames so that the forms on adjacent frames lie in close contact with each other and cooperate to form continuous domes.

2. An apparatus for laying concrete floors comprising a plurality of frames of uniform size and shape adapted to be supported on temporary supports to form a continuous floor mold, leaving an open space of less than the length of the frame between two sections, skeleton frames adapted to be mounted in said space to position the adjacent temporary supports and bridge said space, dome-shaped forms mounted on said uniform frames and spaced from each other to form a joist between them, and lap forms mounted on said dome forms for continuing the domes over said space, said lap forms having lateral flanges for continuing the joist form over said space, and downwardly projecting flanges on the lateral flanges for uniting the adjacent lap forms between the frames.

3. An apparatus for laying concrete floors comprising a plurality of temporary supports having tops, a plurality of frames detachably supported on said supports and arranged in the plane of said tops and engaging the sides thereof, and a plurality of dome-shaped forms mounted in each of said frames and flush with the ends thereof so that the ends of the forms on adjacent frames engage each other and cooperate to form continuous domes.

4. An apparatus for laying concrete floors comprising a plurality of temporary supports having tops, a plurality of frames detachably supported on said supports and arranged in the plane of said tops and engaging the sides thereof, and a plurality of elongated dome-shaped forms mounted in each of said frames in parallel relation and spaced from each other and from the sides of the frames to form joist molds between successive domes, said forms projecting over the end members of the frames into engagement with the ends of the dome forms on the adjacent frames to form continuous domes therewith.

5. An apparatus for laying concrete floors comprising a plurality of temporary supports having tops, a plurality of frames detachably supported on said supports and arranged in the plane of said tops and engaging the sides thereof, and a plurality of dome-shaped forms mounted on said frames and spaced from each other and from the sides of the frame to form joist molds between them and the dome forms on laterally adjacent frames and at one end projecting over the end member of the frame into engagement with the ends of the dome forms on the adjacent frames to form continuous domes therewith, and terminating short of the end of the frame at the other end, and plates for closing the open ends of the domes and cooperating with the end members of the frames to form a beam mold arranged transversely to the joists.

6. An apparatus for laying concrete floors comprising a plurality of shores having tops and a plurality of frames mounted on said shores and releasably engaged thereby to form a floor mold, each of said frames comprising side and end members arranged in the form of a rectangle, brackets arranged between and connecting the adjacent ends of the side and end members formed to fit against the sides of the top of a shore on which it is mounted, a pair of bars connecting the end members of the frame to divide the frame into two spaces, means for closing the opening between said bars, and a form in each of said spaces secured to one of the side members of the frame and the adjacent bar.

7. An apparatus for laying concrete floors comprising a plurality of shores having tops, a plurality of frames detachably mounted on said shores and arranged in the plane of said tops and engaging the sides thereof, each of said frames having a plurality of openings therein, dome frames having open ends secured in said openings and projecting above the frame, reinforcing bars arranged in said dome forms adjacent the ends thereof, and plates secured to the frame and engaging said reinforcing bars for closing the ends of the domes.

In witness whereof, I have hereunto signed my name.

HENRY W. ROOS.